United States Patent [19]

Taccon et al.

[11] Patent Number: 5,266,115
[45] Date of Patent: Nov. 30, 1993

[54] SERVOCONTROLLED AXIS MANIPULATOR WITH PROGRAMMABLE SPRAYING HEADS

[75] Inventors: Danizzo Taccon, Sesto S. Giovanni; Gloriano Taccon, Cologno Monzese, both of Italy

[73] Assignee: Taccon Construzioni Meccaniche S.D.F. di A. Gironi & C., Milan, Italy

[21] Appl. No.: 849,537

[22] Filed: Mar. 11, 1992

[30] Foreign Application Priority Data

Mar. 12, 1991 [IT]  Italy ........................ MI91A 000663
Mar. 4, 1992 [IT]   Italy ........................ MI92 A 000482

[51] Int. Cl.$^5$ .................... B05C 11/00; B05B 3/00; B05B 7/12; B05B 7/04
[52] U.S. Cl. ........................ 118/663; 118/323; 118/696; 239/412; 239/434; 239/227; 239/264
[58] Field of Search ............. 118/323, 663, 696, 694; 239/227, 264, 751, 752, 412, 417.5, 434

[56] References Cited

U.S. PATENT DOCUMENTS

| | | | |
|---|---|---|---|
| 3,606,162 | 9/1971 | Lehmann | 118/323 |
| 3,791,580 | 2/1974 | Taccon | 238/434 |
| 4,564,410 | 1/1986 | Clitheros et al. | 118/323 |
| 5,052,338 | 10/1991 | Maiorca et al. | 118/323 |

Primary Examiner—W. Gary Jones
Assistant Examiner—Steven P. Griffin
Attorney, Agent, or Firm—Young & Thompson

[57] ABSTRACT

A manipulator with servocontrolled axes, has two or more programmable heads for spraying various liquids and/or air into moulds, more particularly foundry moulds. The manipulator is controlled by a programmable logic (CPU) to move two or more spraying heads in a continuous or discontinuous mode along a predetermined path. The heads are designed to spray, in a programmed manner, various liquids which are atomised either under pressure or by a strong jet of compressed air, thus performing the dual action of atomiser and air blower.

6 Claims, 4 Drawing Sheets

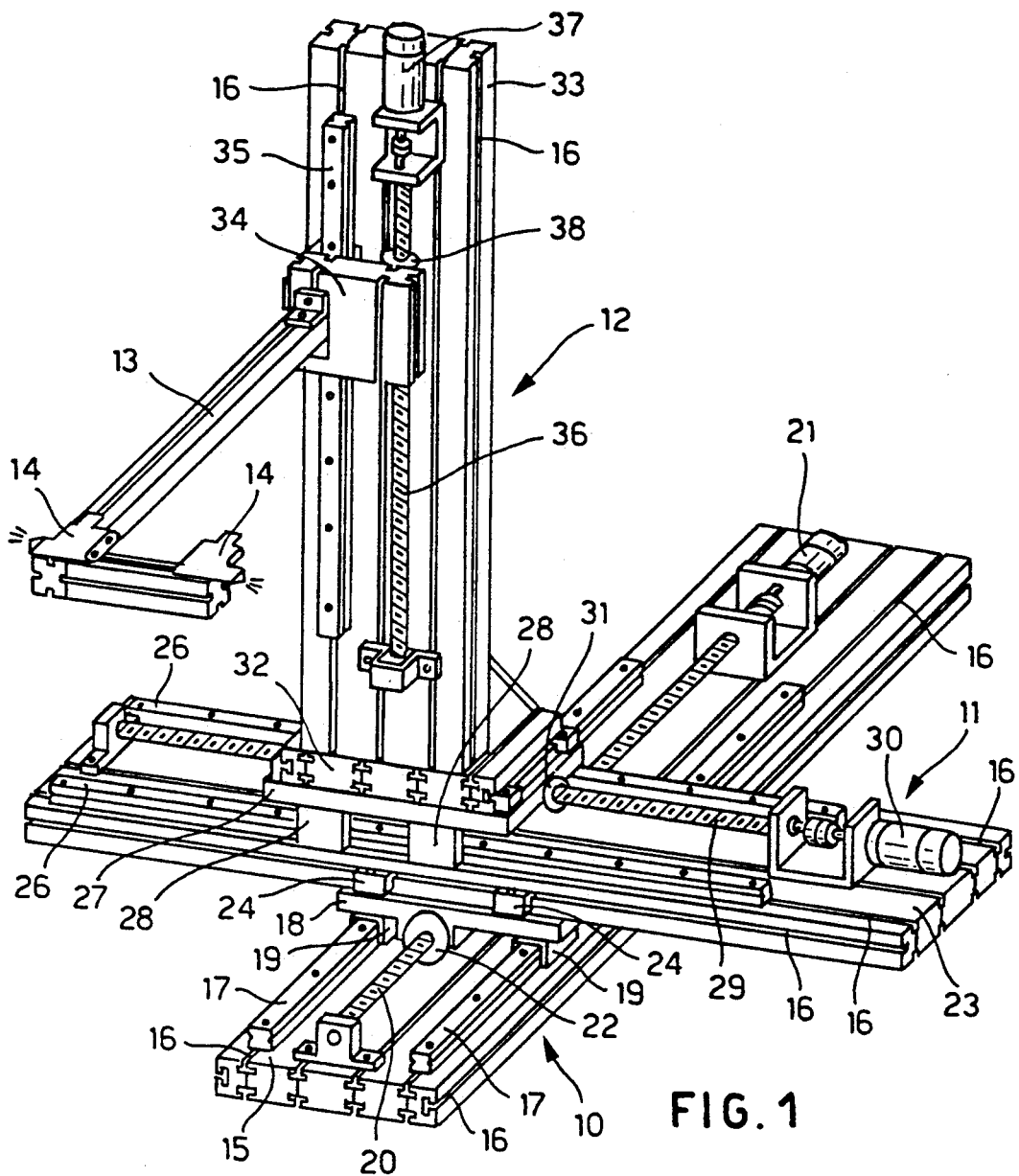
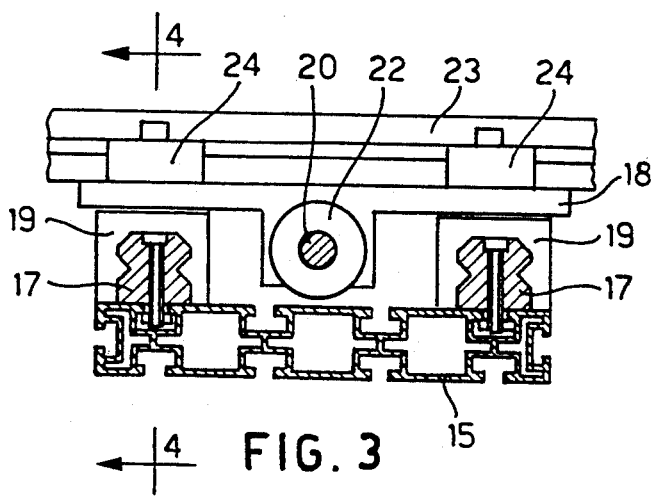
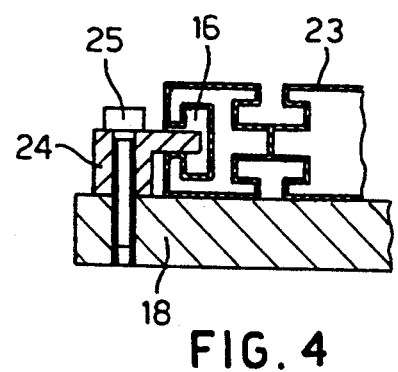

SERVO CONTROLLED AXIS MANIPULATOR WITH PROGRAMMABLE SPRAYING HEADS

BACKGROUND OF THE INVENTION

1. Field of the Invention

The present invention relates to a manipulator having one or more servocontrolled axes, with spraying heads suitably made to spray, in a programmable manner, various liquids which are suitably atomised either under pressure or by a controlled jet of pressurised air, thus enabling each head to perform the dual function of atomiser and air blower.

2. Description of the Related Art

In the field of foundries, and die molding in general, there is the need to spray different treatment liquids, for example lubricating or releasing agents, or compressed air inside a mould, for the routine operations of cleaning and preparing the moulds.

Given the complex configuration and structure of the moulds, more particularly in the field of foundries, manual sprayers are at present used on each occasion, actuated by the relevant operator.

Likewise known are multiaxis actuators in general, nevertheless their use in foundry production processes and in die molding in general, for cleaning and preparing moulds, is somewhat difficult and onerous, due to the extremely bulky structure of the manipulator, unsuitable for allowing the insertion of the spraying heads between an open mould of complex shape and configuration.

At present, servocontrolled axis manipulators with programmable spraying heads are not known to be simple in structure, inexpensive and extremely versatile in use. Furthermore, there is no possibility of adjusting the quantities of liquid sprayed.

SUMMARY OF THE INVENTION

The object of the present invention is to provide a manipulator with one or more servocontrolled axes and with programmable spraying heads, suitable for fulfilling the needs referred to above.

A further object of the present invention is to provide a manipulator, as related above, fitted with one or more spraying heads which are designed to perform a dual function of atomiser and air blower and also which are suitably adjustable and tiltable in a fully independent manner, in order to spray liquids and to blow air into whatsoever point or direction required.

A further object of the present invention is to provide a manipulator, as related above, provided with servocontrolled spraying heads which also have the possibility of adjusting the quantity of liquid sprayed.

These and other objects are achieved by a servocontrolled axis manipulator, with programmable spraying heads.

BRIEF DESCRIPTION OF THE DRAWINGS

The manipulator with programmable spraying heads, according to the present invention, will be illustrated in greater detail hereinbelow, with reference to the figures in the accompanying drawings in which:

FIG. 1 is a perspective view of a three-axis manipulator;

FIG. 3 is an enlarged sectional view along line 3—3 of FIG. 2;

FIG. 4 is an enlarged sectional view along line 4—4 of FIG. 3;

DETAILED DESCRIPTION OF THE PREFERRED EMBODIMENTS

Figures 2, 7:
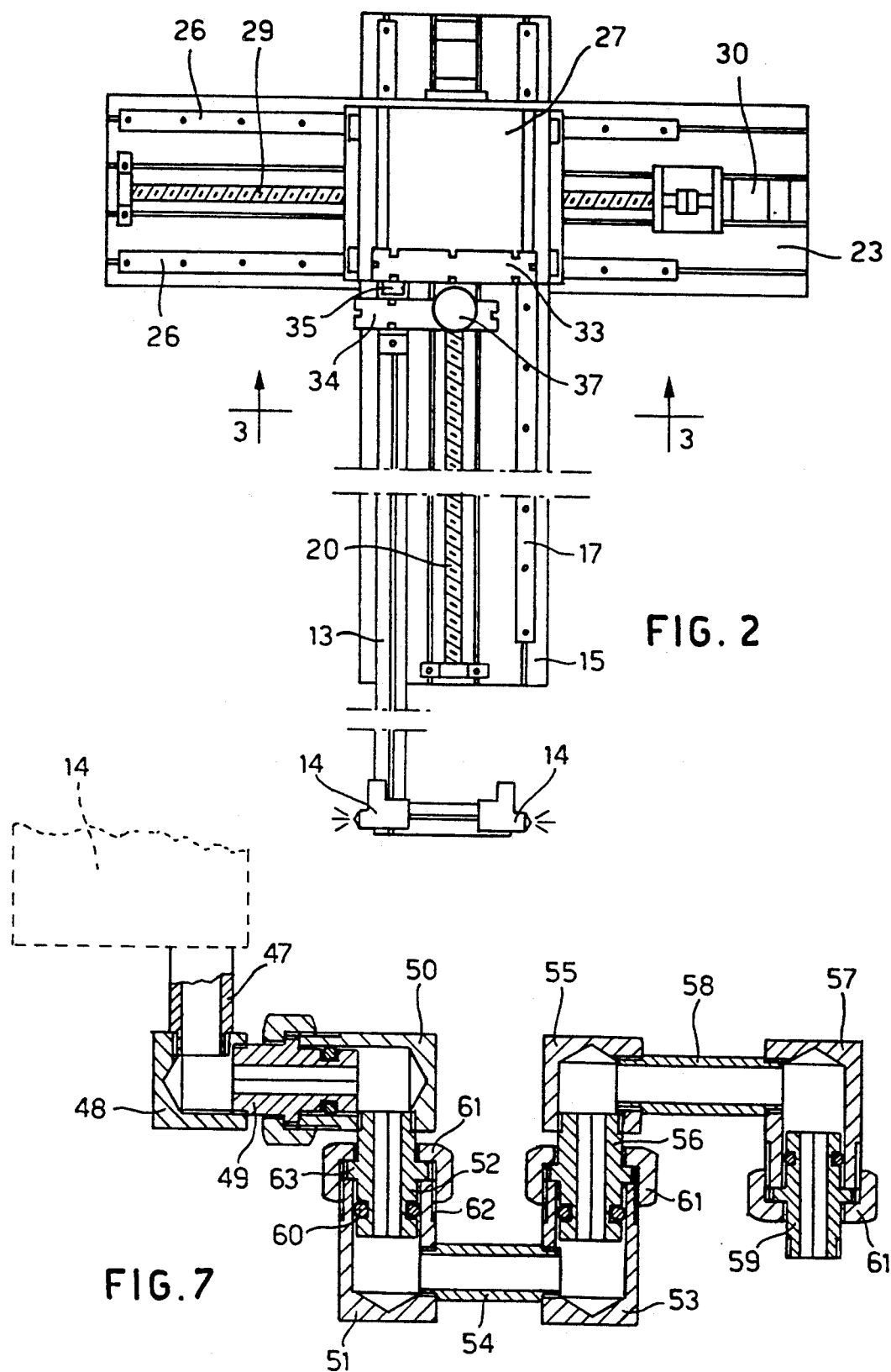
FIG. 2 is a top view of the manipulator of FIG. 1.
FIG. 7 is an enlarged detail of an articulated conduit for feeding a spraying head according to the previous FIGS. 5 and 6.

With reference to FIGS. 1 to 4, we will describe hereinbelow the general characteristic features of a manipulator with three servocontrolled sliding axes for the programmed movement of two spraying heads; nevertheless, it is understood that a manipulator according to the invention could have any number of sliding and/or rotational axes, positioned differently in order to move or position the heads according to whatsoever path required. These movements or positions can be obtained, in a programmed manner, by either linear and/or circular interpolation, in whatsoever plane and/or space, by a suitable programming unit.

The example in FIG. 1 shows a three-axis manipulator, whereby two spraying heads can be moved in the directions defined by three orthogonal axes, as represented schematically. Nevertheless, the manipulator can be manufactured with one or more axes according to uses and necessities.

More precisely, the manipulator comprises a first horizontal axis 10, also referred to as the longitudinal axis, a second horizontal axis 11, also referred to as the transverse axis, slidingly supported by the previous axis and a third vertical axis 12 slidingly supported by the transverse axis 11 referred to above. An arm 13 in FIG. 1 is sliding along the vertical axis 12 to support two spraying heads 14 suitably attached to the arm 13 in a pre-positioned or variously adjustable manner, as will be explained hereinunder.

As shown in the figures, the first axis 10, or the longitudinal axis, consists of a tubular metal section 15, having a plurality of longitudinal slots 16 for assembling the various components. The use of slotted tubular sections for accomplishing manipulator axes is found to be extremely advantageous since it not only allows easy and rapid assembly of the various components, but it also substantially reduces the weight of the moving parts of the manipulator.

Fixed on the two sides of the section 15, at respective longitudinal slots 16 there are two metal bars or prismatic guideways 17, along which a carriage 18 slides, supporting the transverse axis 11. The carriage 18 is provided with sliding blocks 19, and is moved by a nut screw drive system, comprising a screw 20, actuated by a direct current motor 21, shown in the diagram in FIG. 9, and a ball lead nut or nut screw 22 carried centrally by the carriage 18.

Similarly, the second horizontal axis 11 consists of a tubular section 23, identical or similar to the previous one, attached to the carriage 18 by clamps 24, which enable the longitudinal position of the section 23 to be adjusted in relation to the carriage 18. This arrangement is shown in the detail of FIG. 4 where it can be seen that each clamp 24 has a projecting part which engages in the longitudinal slot 16 of the section 23, said clamp 24 being attached to the surface of the carriage 18 by a screw 25.

Correspondingly, the second axis 11 comprises two prismatic guideways 26 attached to two longitudinal slots 16 for the sliding of a second carriage 27 provided with sliding blocks 28.

In a similar way to the first axis 10, the carriage on the second axis 11 is moved longitudinally by a ball-nut screw drive system 29, 31 actuated by a respective direct current motor 30.

The third axis or vertical axis 12 is in turn attached, for example by an intermediate section 32, to the carriage 27 of the second axis 11 in order to be mobile with it. In this case too, the vertical axis 12 consists of a tubular metal section 33 with longitudinal slots 16 for attaching the various components. More particularly, as shown in FIG. 1, in order to reduce the overall dimensions of this third axis 12 as much as possible, the horizontal arm 13 supporting the spraying heads 14, is attached to a carriage 34 guided along the axis 12 by a single prismatic guideway 35, as well as by a screw 36 driven by its own direct current motor 37. The screw 36 in turn engages with a ball nut screw 38 carried by the carriage 34 on the opposite side of the prismatic guideway 35.

From what has been said so far, it is clear that, by manufacturing each axis of the manipulator with a tubular metal section provided with prismatic guideways for the sliding of a carriage attached to the section along corresponding longitudinal slots, this arrangement not only allows the positioning of the various components to be adjusted, but also provides an extremely simplified and economic construction of each axis, at the same time maintaining high working flexibility and reliability of the entire manipulator. Furthermore, since the spraying heads 14 are carried by the arm 13 with extremely small overall dimensions, which arm 13 projects cantilevered from the carriage 34 of the vertical axis 12, it is clear that in this way the spraying heads 14 can be inserted between the opposite surfaces of an open mould, choosing the most appropriate direction for insertion according to the structural complexity of the mould and the positioning in relation to the latter by the manipulator.

The solution of FIGS. 1 and 2 enables the arm 13 with the spraying heads 14 to be inserted either laterally or from above the upper part of a die-casting machine.

Moreover, in the solution shown in FIGS. 1 and 2, the two axes 11 and 12 enable movement along both rectilinear and curved paths, achieved either through linear interpolation of the two movements, or by circular interpolation, or by a combination thereof, controlled by a suitable logic unit. The third axis 10, in the case shown, is used to move in space. In combination with or in place of one of the axes 10, 11 and 12, a rotational axis could also be used, placing a rotary table, driven to rotate either continuously or reciprocally by a motor, on a suitable structure or on one of the carriages.

FIGS. 1 and 2 represent schematically two opposite spraying heads 14, attached to a transverse section of the support arm 13, without any possibility of relative positioning. Nevertheless, it is preferable that the spraying heads 14 are adjustable in relation to the support arm 13 in order to adapt to the various requirements of use.

Figure 5:
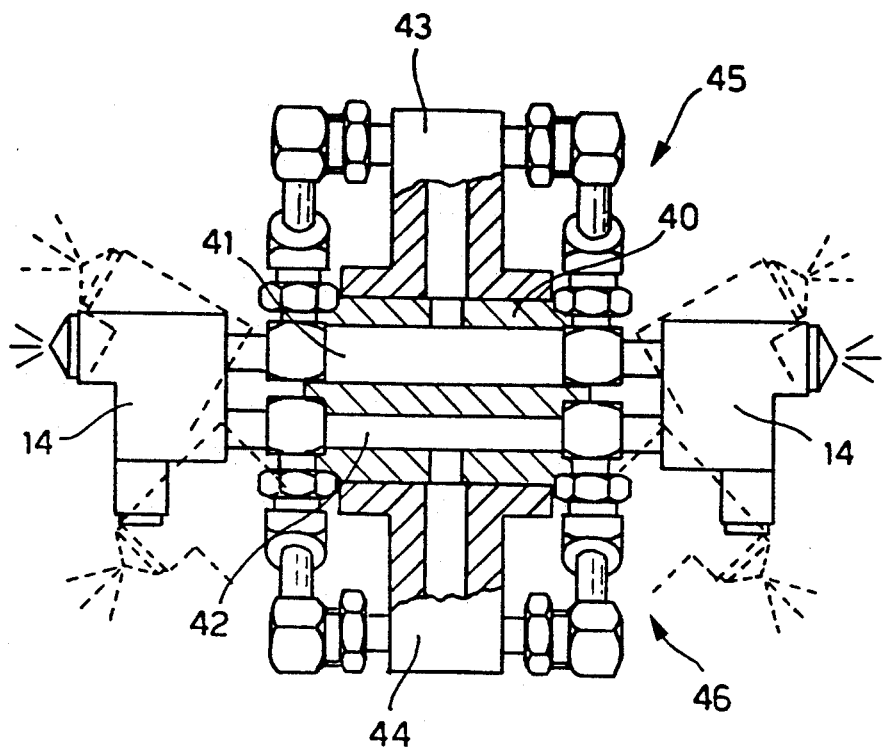
FIG. 5 shows a front view of a distributor with two adjustable spraying heads, according to a further characteristic feature of the invention.
Figure 6:
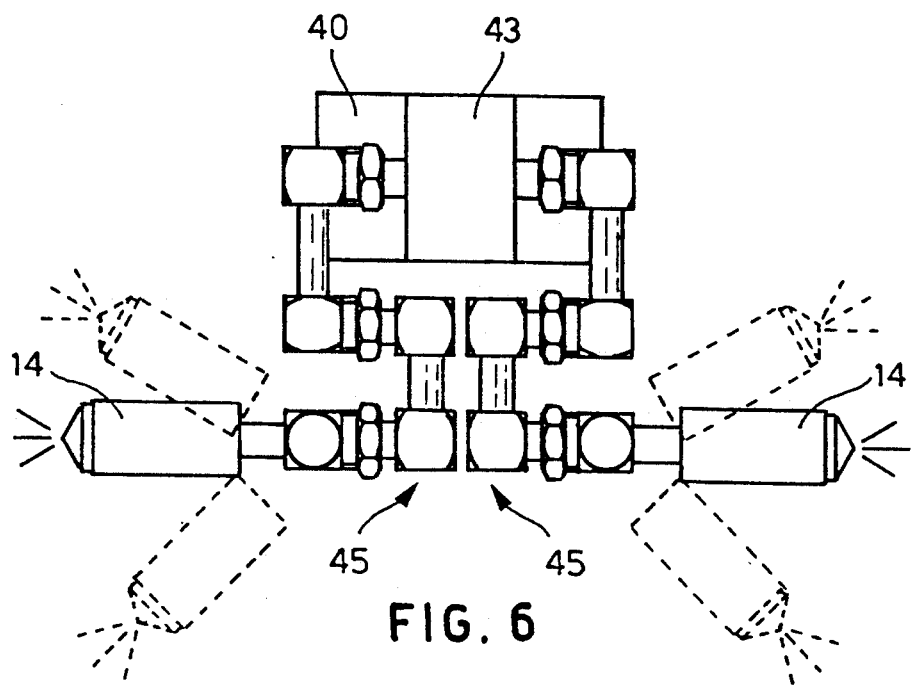
FIG. 6 shows a top view of FIG. 5.

The heads 14 could be supported and positioned by whatsoever suitable means FIGS. 5 to 7 show a preferential solution which makes use of special articulated conduits that allow both feeding of fluids to the heads 14 and positioning of the same heads 14.

The use of articulated conduits is shown in FIG. 5 for two heads 14 fed with one or more fluids and with compressed air, by a distributor 40 having a first conduit 41 for feeding compressed air which is used for the aspiration and atomisation of a liquid fed to the heads 14 by the distributor 40, by a second conduit 42.

The conduits 41 and 42 of the distributor 40 are connected to the respective inlets of air and liquid of each head 14, as explained hereinbelow, via fitting elements 43 and 44 and also via respective articulated conduits 45 and 46 which, as shown in FIG. 7, define various orthogonal axes of positioning in space for each head 14.

In the case shown in FIGS. 5 and 6, the two fittings 43 and 44 are used to feed compressed air and a treatment liquid to two opposite heads 14; The distributor 40 could be provided to feed also more than two heads 14, according to the requirements of use of the manipulator.

FIGS. 5 and 6 show a front view from above the articulated conduits for feeding and positioning the heads 14, while FIG. 7 shows a view lying in a plane of one of the conduits, in order to clarify its characteristic features and the relative position of the various articulation axes.

Each feed conduit, for example the conduit 45 or 46, is formed by several tubular sections variously articulated and positioned one with respect to the other.

More particularly, as shown in FIG. 7, each articulated conduit 45 and 46 comprises a first tubular section 47 screwed into a first inlet of the head 14 and respectively to a first intermediate joint 48. The articulated conduit 45 moreover comprises a second tubular section 49, orthogonal to the previous one, defining a first axis of relative rotation between the joint 48 and a second intermediate joint 50; the latter is connected in turn to a third intermediate joint 51 via a third tubular section 52 defining a second rotational axis orthogonal to the previous one. The third joint 51 is connected in turn to a fourth joint 53 by intermediate a fourth intermediate tubular section 54 screwed to the above joints and arranged parallel to the first rotational axis through the tubular section 49. Fourth joint 53 is connected in turn to a fifth intermediate joint 55 via a fifth tubular section 56 defining a third rotational axis parallel and coplanar to the second rotational axis through the tubular section 52. The fifth joint 55 is connected to a sixth joint 57 via a sixth intermediate tubular section 58, and the latter sixth joint 57 is finally connected to the distributor via a final tubular section 59 defining a fourth rotational axis parallel to the axes through sections 52 and 56. The second articulated conduit 46, connected to the other inlet of the head 14, is formed identically to the articulated conduit 45. In this way, each head 14 is supported by a complex of 90° articulations which allow the head 14 to be positioned angularly both in a vertical and/or in a horizontal plane. The number and arrangement of the rotational axes of the articulations could also be different from what is shown.

Each head 14 may be locked in whatsoever angular position is selected as shown by the dotted lines in FIGS. 5 and 6, thus preventing rotation of the respective articulation axes. In this respect, as best shown in FIG. 7, each tubular section defining a rotational axis is composed of a tubular element, one extremity of which screws into a joint while the other extremity is free to rotate in the other joint thus providing a suitable toroidal seal or O-ring 60. The tubular element is locked in the required angular position by a ring nut 61 which screws onto a threaded portion 62 of the relative joint, locking a flange 63 of the tubular element against the threaded extremity of the joint element. In this way, by loosening the individual ring nuts 61 of the various articulation axes of the two articulated conduits, it is possible to position each head 14 vertically and horizontally and lock it into position by rescrewing once again the ring nuts 61.

Figure 8:
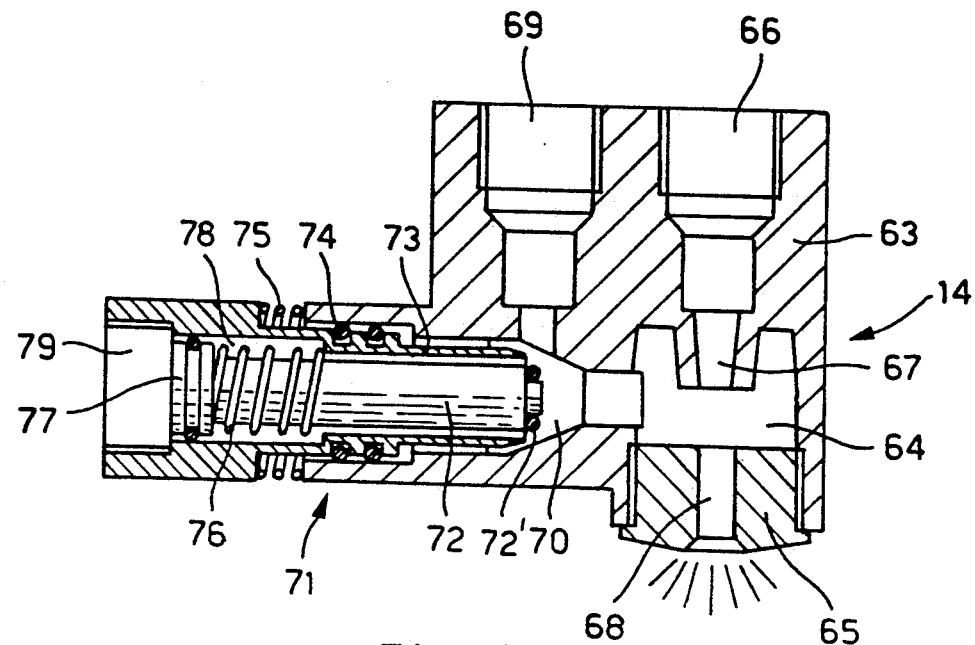
FIG. 8 is an enlarged section of a spraying head according to the invention.

The spraying heads 14 may be of whatsoever suitable type, for example of the type with high pressure liquid atomisation or, according to another aspect of the invention, of the type shown in FIG. 8 in which each spraying head 14 aspirates the liquid, via a vacuum created by a flow of compressed air, and comprises an air-actuated control valve so as to act both as a liquid atomiser and an air blower.

In this respect, each spraying head 14 comprises a body 63 having a suction chamber 64 provided with a spraying nozzle 65 screwed into the suction chamber 64 itself. The suction chamber 64 is directly connected to a first inlet 66 for the compressed air which flows into the suction chamber 64 through a convergent conduit or inverted nozzle 67, partially projecting into the suction chamber 64 in line with a bore 68 of the spraying nozzle 65.

The spraying head 14 comprises a second inlet 69 for the liquid to be sprayed, leading into a convergent passage 70 which opens into the suction chamber 64 orthogonal to and at a short distance from the inverted nozzle 67 which feeds the air under pressure.

The convergent passage 70 extends at the rear in the body 63 of the spraying head 14, with a cylindrical section for housing a servocontrolled control valve 71, actuated by the same air under pressure, as explained hereinbelow.

The control valve 71 substantially comprises a closing member 72 provided with an O-ring 72′, said member 72 being movable longitudinally in a sleeve 73 which can be screwed into the cylindrical portion of the convergent passage 70. Seals 74 provide the necessary tightness while a first counter spring 75 enables the position of the sleeve 73, and hence the flow of the liquid, to be adjusted, closing to a greater or lesser extent, with its internal extremity, the passage of the liquid from the second inlet 69.

The closing member 72 is normally returned into an open condition of the control valve 71 by a second counter spring 76 which on one side rests against an annular shoulder inside the sleeve 73, while on the other side rests against a piston member 77 sliding in a cylindrical chamber 78 formed in the rear cylindrical portion of the sleeve 73, coaxially to an inlet 79 for the air under pressure.

It is clear therefore from FIG. 8 that, in the condition shown, in which the control valve 71 is open, the feeding of air under pressure through the first inlet 66 generates a vacuum in the chamber 64 which creates a suction of the liquid through the second inlet 69 which, through the convergent passage 70, enters the chamber 64 and in this way is sprayed in an atomised form through the nozzle 65.

The spraying head 14 designed in this way is therefore able to function by exploiting the known Venturi effect to create the necessary vacuum for sucking the liquid, in a totally controlled manner, by the valve 71 which allows the performance of the two functions of atomiser and of air blower. It is thus clear that, by feeding air under pressure to the valve 71, through its inlet 79, the piston member 77, overcoming the reaction of the second counter spring 76, acts to move the closing member 72 forwards until the convergent passage 70 is closed tight. In this way the entry of the liquid is prevented and the spraying nozzle 65 of the head 14 is only fed with compressed air.

Figure 9:
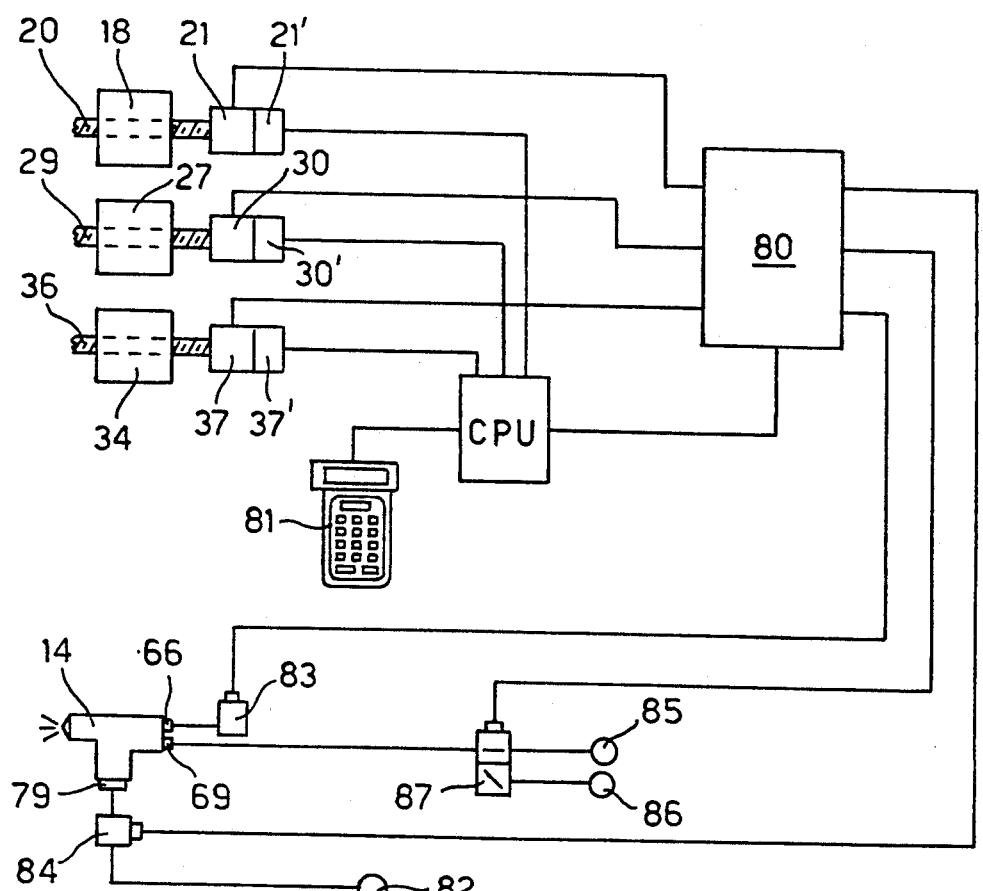
FIG. 9 is a general diagram of the control and fluid feed apparatus for the manipulator in FIG. 1.

With reference to FIG. 9, we will describe finally a general diagram of a programmable control apparatus of the manipulator and spraying heads 14 according to the invention.

As can be seen from FIG. 9, each motor 21, 30 and 37 for driving the three axes of the manipulator is connected to an electrical feeder 80 controlled by a CPU which can be programmed by a programming keyboard 81. The keyboard 81 is for example of the portable type with a liquid crystal monitor on which there is a guided menu that can be selected by function keys of the keyboard 81 to set all the movements of the manipulator according to the path which the spraying heads 14 have to follow in order to enter and exit a mould. Each drive motor 21, 30, 37, is provided with a signal generator or encoder 21′, 30′, and 37′ which send respective control signals to the CPU corresponding to the positions of the carriages 18, 27 and 34, respectively.

It can be seen moreover from FIG. 9 that the inlets 66 and 79 for the compressed air are connected to a source 82 for air under pressure through respective servovalves 83, 84 actuated by the electrical feeder 80 under the control of the CPU. Finally, in the same FIG. 9, it can be seen that the inlet 69 for the liquid can be connected to one or more sources 85, 86, for liquid via one or more servovalves 87, again actuated by the electrical feeder 80 under the control of the CPU. It is therefore clear that, as a function of the working program already stored in the memory and the program of the path which can be stored each time in the logic control unit, not only is it possible to program the sequences of the positions which the various carriages 18, 27, 34 of the three axes will assume either continuously or by steps, but also it is possible to control in a programmed manner the sequence of operations of spraying the treatment and cleaning the liquid or liquids, by applying air under pressure, in the two levels of a mould, via a servocontrolled manipulator which is extremely practical and versatile to use and which combines these characteristic features with a very simple construction and economical use.

What is claimed is:

1. Servocontrolled manipulator comprising:
   head means for spraying at least one treatment liquid and for feeding air under pressure;
   at least one metal section extending along a controlled axis of the manipulator having a longitudinal slot means for assembling component parts thereon;
   at least one guideway attached in one of the longitudinal slot means;
   a carriage means for sliding along the guideway, said carriage means having an arm means for supporting the head means;
   a screw-nut transmission means for driving the carriage means;
   said screw-nut transmission means being connected to a drive motor;

said screw-nut transmission means and said drive motor being attached to the longitudinal slot means;

each head means being connected to at least one source of treatment liquid via a servovalve;

a programmable logic control unit (CPU) being operatively connected to said servovalve and also to the drive motor;

means for detecting the position of the carriage means along the guideway;

means for controlling movement of the arm means along a programmed path;

wherein said arm means includes an articulated conduit means for feeding compressed air and a liquid to each head means;

said articulated conduit means includes a plurality of tubular sections, articulated one to the other;

said tubular sections being angularly adjustable one to the other; and said articulated conduit means also includes means for locking rotation of each of the plurality of tubular sections.

2. A programmably controlled, multi-axis manipulator comprising:

head means for spraying at least a treatment liquid and/or pressurized air into a cavity of a mould;

an arm means for supporting said head means;

means for adjustably connecting the head means to said arm means;

carriage means for supporting said arm means;

said carriage means having carriage members and guide members extending along a controlled axis of the manipulator;

said carriage members being connected to screw-and-nut drive means for independently moving each carriage member along the controlled axis of the manipulator;

means for detecting a position of the carriage member along the controlled axes of the manipulator;

wherein each head means includes the following:

a body having a suction chamber provided with a spray nozzle, an air inlet port, and a liquid inlet port;

said air inlet port having a first injection nozzle opening into the suction chamber and being axially aligned with the spray nozzle;

said air inlet port being connected to a pressurized air source by a first servovalve;

convergent bore means in said body for defining a second injection nozzle opening into the suction chamber orthogonally towards the first injection nozzle of the air inlet port;

said second injection nozzle being connected to the liquid inlet port by a pneumatically actuated throttling valve;

said liquid inlet port being connected to a liquid source by a second servovalve;

wherein said throttling valve includes the following:
  a throttling sleeve member axially aligned and screwably adjustable towards the second injection nozzle;
  a closing member slidably disposed inside the sleeve member;
  pneumatically actuated control means for moving said closing member between advanced and retracted positions to close and to open the second injection nozzle with respect to the liquid inlet port; and
  a programmable control unit operatively connected to the first and second servovalves, to the control means for the throttling valve, to the drive means for the carriage members, and to the means for detecting a position of the carriage member along the controlled axes of the manipulator in order to control movement of the head means along a programmed path.

3. The manipulator according to claim 2 wherein:

said air and liquid inlet ports are connected to the air and liquid sources respectively by air and liquid feeding conduits having articulated tubular sections connected by articulated joint members angularly adjustable on at least two parallel and/or orthogonally arranged rotational axes; and further wherein:

said means for adjustably connecting the head means to the arm means includes said articulated tubular sections and disengageable means for locking rotation of said articulated joint members in a selectively adjusted position of the head means.

4. The manipulator according to claim 3, wherein: said means for detecting the position of the carriage member is a signal generator connected to a drive motor of the screw-and-nut drive means.

5. The manipulator according to claim 3, wherein: said inlet port for the liquid of each head means can be connected to one or more liquid sources via respective servovalves controlled by the programmable control unit.

6. The manipulator according to claim 3, wherein: said air and liquid feeding conduits are connected to air and liquid sources by a liquid and air distributor provided on the arm means.

* * * * *